Patented Jan. 10, 1950

2,494,416

UNITED STATES PATENT OFFICE 2,494,416

AZO-DYESTUFFS AND PROCESS OF MAKING SAME

Fritz Straub, Kaiseraugst, Walther Hanhart, Riehen, and Emil Mannhart, Basel, Switzerland, assignors to Ciba Limited, a Swiss firm No Drawing. Application April 3, 1945, Serial No. 586,436. In Switzerland March 28, 1944

Section 1, Public Law 690, August 8, 1946
Patent expires March 28, 1964

15 Claims. (Cl. 260—160)

It is well known in azo chemistry that there are many azo dyestuffs of comparatively poor fastness to light. It is further known that azo dyestuffs containing in both radicals, interconnected by an azo group, a so-called lake-forming group ortho to the said azo group (e. g. a hydroxyl group) are as a rule capable of forming complex metal compounds and that the said complex metal compounds show generally an improved fastness to light as compared with the non-metallized dyestuffs. It is to be remarked that sulfonic acid groups are no equivalents of the said lake-forming groups. As far as known the grouping

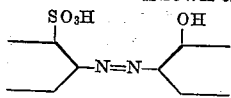

is not capable of forming complex metal compounds or at least no stable complex metal compounds are formed.

The present invention is concerned with dyestuffs derived from diazo compounds containing a sulfonic acid grouping or its equivalents in ortho position to the diazo group. More particularly the present invention provides new substantive dyestuffs derived from pyrazolones as coupling components which contain lake-forming groups. Due to the presence of the said lake-forming groups the resulting dyestuffs are capable of forming stable complex metal compounds. It is surprising to see that in such azo dyestuffs (as hereinafter defined) the sulfonic acid grouping in ortho position to the azo group brings about a substantially increased fastness to light although, as explained above, the ortho-sulfo-ortho-hydroxy azo grouping is not capable of forming stable complex metal compounds.

According to this invention valuable azo-dyestuffs are obtained by coupling diazo compounds of amines of substantive character which in ortho-position to at least one diazo-group contain a sulfonic acid group or sulfonamide group, with pyrazolones having lake-forming groups and, if desired, by treating the resulting dyestuffs with agents yielding metal.

The amines of substantive character used in the present process as diazo components may either be used directly as such or may be formed only in the course of the preparation of the dyestuff, i. e. wholly or partly after the coupling with the corresponding pyrazolones. For the purpose of this invention amines of substantive character are amines which, if coupled with indifferent azocomponents, such as 2-hydroxy-naphthalene, are capable of producing substantive dyestuffs. Such amines may belong to the benzene or naphthalene series, for instance, and may contain also heterocyclic or higher-condensed ring systems; they may, for example, be of paradiamine structure, as is the case, among others, with the benzidine and para-phenylene-diamine derivatives. They may further contain substantivating groups or radicals like acid amide or urea groups, also radicals derived from, say, cyanuric chloride, dehydrothiotoluidine, carbazole, stilbene, 2-amino-5-hydroxynaphthalene-7-sulfonic acid or other substantive groupings.

The following are examples of such amines of substantive character: benzidine-3:3'-disulfonic acid, 4-amino-4'-hydroxy-3'-carboxy-1:1'-azo-benzene-3-sulfonic acid as well as those of the following formulae:

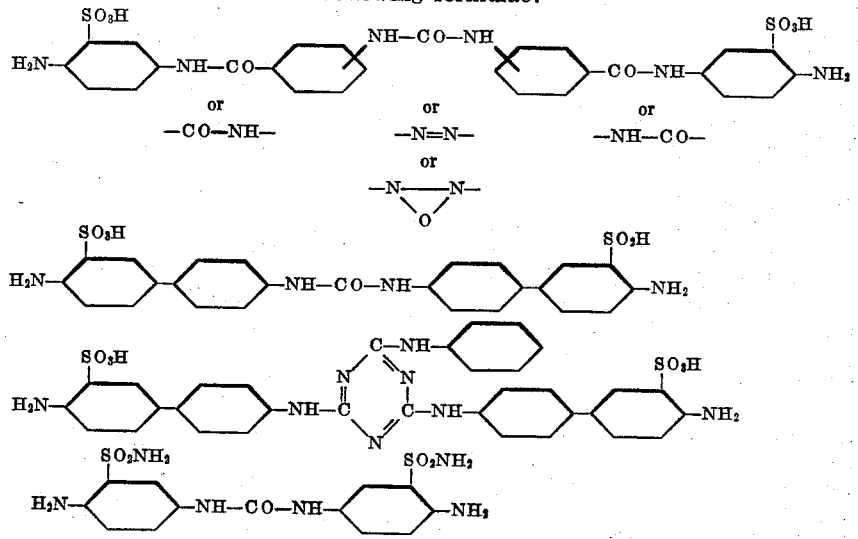

and also the corresponding mixed ureas.

It is to be understood that the above amines or diamines may contain various substituents normally occurring in substantive azo-dyestuffs, such as halogen atoms (especially chlorine and bromine), nitro groups, alkyl and alkoxy groups, such as methyl, methoxy, ethoxy, propyloxy, isopropyloxy groups, etc. In the case of triazine compounds only one or three compounds containing a diazotizable amino group may be attached to the triazine ring, or the aniline radical shown in the above formula may be replaced by the radical of other amines such as methyl, ethyl or ethanol amine.

The amines used in the present process as diazo components must not only be of substantive character, but it is necessary that they contain a sulfonic acid group or a sulfonamide group in ortho-position to at least one diazotizable amino group. Equivalents of the sulfonic acid group are groups which are readily converted into such a group, like sulfonic acid ester groups. Sulfonamide groups may contain substituents of various kind, linked to the nitrogen atom in known manner. In case the amine contains more than one, for example two or more diazotizable amino groups, sulfonic acid groups or sulfonamide groups may be linked in ortho-position to more than one, preferably to two or, if more are present, even all amino groups.

According to the present process, amines of the kind described above, after suitable diazotizing (or tetrazotizing, etc.) are coupled with pyrazolones containing lake-forming groups. In these pyrazolones the lake-forming groups may, for instance, be linked to a radical acting as substituent of the pyrazolone ring, for example a naphthalene radical or especially a phenyl radical. Lake-forming groups may be attached as well to some other radical which is connected with the pyrazolone through various bridge members, for instance again to a phenyl radical. As lake-forming groups there may be used the generally known groups of this kind, more especially, however, the salicyclic acid grouping. Bridge members, if present, may be of substantivating character, like the azo group in para-position, the benzidine grouping and the carbonamide grouping.

The following are examples of such pyrazolones which, besides, may be substituted in known manner, for instance in 3-position by a methyl or carboxyl group: 1-(3'-carboxy-4-hydroxyphenyl) - 3 - methyl-5-pyrazolone and 1-phenyl - 3 - methyl-5-pyrazolone-4'-carboxylic acid-4''-hydroxy-3''-carboxy-1''-anilide.

Coupling of the diazo-compounds with the pyrazolones can be effected in known manner in an alkaline medium, for example, in a medium alkaline with alkali-carbonate.

Instead of coupling the finished substantive diazo compound with the pyrazolones, it is in many cases quite as easy or even more expedient to build up the radical of the diazo component, which determines the affinity for the vegetable fiber, wholly or partly only after coupling with the pyrazolones. In such cases, a simple amine of the benzene or naphthalene series for instance, which contains in ortho-position to the amino group a sulfonic acid or sulfonamide group, and, as further substituent, for instance in para-position to the amino-group, a group which is suitable for a linking-reaction, for example one which is readily transformed into an amino group, can be diazotized and coupled with pyrazolones having a lake-forming group, whereupon, in subsequent steps, the linking-reactions can take place, for instance the conversion of the substituent referred to into an amino group and the change of the amino group into a suitable bridge member, such as an acid amide group, a urea group, an azo group, etc. Similarly, an acid group, for instance a carboxyl group contained in the original amine may be condensed with further amines to build up afterwards the radical of a substantive amine in this way. It is also possible to link by reduction any nitrogen groups contained in the original amines, for instance by the action of weak reducing agents, like dextrose, in an alkaline medium, whereby azo- or azoxy groups are formed. Such methods of working being generally known, they need not be explained in detail here.

The azo-dyestuffs obtained according to the present process contain at least one, though preferably two or more azo-groups. Thanks to their substantive character they are used above all for dyeing and printing cellulosic fibers, such as cotton, linen, rayon and staple fiber from regenerated cellulose and, under certain circumstances, also for dyeing animal fibers, such as wool or leather.

Specially valuable results are obtained if the dyestuffs are treated with agents yielding metal, either in substance, in the dyebath or on the fiber. Suitable in this connection are agents yielding, for instance, iron, chromium, and especially copper; in certain cases several agents yielding metal may be used simultaneously, for example mixtures of agents yielding chromium and copper.

Depending upon the choice of components used for the construction of the dyestuff and especially upon the number of the water-solubilizing groups contained therein, especially sulfonic acid- and carboxyl groups, it may be appropriate to convert the dyestus into the complex metal compounds in substance, in the dyebath, or even only on the fiber, the latter procedure being preferable if the water-solubility of the dyestuffs prepared in substance would be insufficient. In this case it is of advantage to apply the dyeing process of U. S. Patent No. 2,148,659, according to which the same bath is first used for dyeing and afterwards for the treatment with agents yielding metal. Agents yielding metal that are resistant to alkaline solutions, like complex copper tartrates and others, are especially suitable in this connection.

In all other respects the treatment with agents yielding metal may be performed in known manner.

The present process permits, among other things, the production of dyestuffs dyeing fast yellow, orange, and yellow-brown shades, especially noted for their fastness to light.

The following examples illustrate the invention, the parts being by weight:

*Example 1*

21.8 parts of 4-nitro-1-aminobenzene-2-sulfonic acid are diazotized in known manner and coupled with 23.4 parts of 1-(4'-hydroxy-3'-carboxyphenyl)-3-methyl-5-pyrazolone in a solution alkaline with sodium carbonate. After the coupling is complete, 48 parts of crystallized sodium sulfide are added, the whole is heated for some time to 60–65° C., neutralized with dilute hydrochloric acid and the dyestuff is precipitated by the addition of sodium chloride. The aminoazo-dyestuff is filtered off, dissolved in 1500 parts of water and, after the addition of 15 parts of crys-

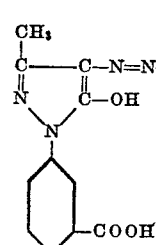

tallized sodium acetate and 20 parts of para-nitro-benzoyl-chloride, is stirred while being heated until it is impossible to detect an amino compound. The nitro-benzoylated dyestuff is separated by the addition of some sodium chloride and filtered off, then dissolved in 2000 parts of water and some sodium carbonate, to make the solution about neutral, then stirred for several hours at 60–65° C. after addition of 48 parts of crystallized sodium sulfide, and separated again by addition of sodium chloride. (The nitrobenzoylated dyestuff may also be reduced directly, without prior precipitation.) After filtering off and dissolution in water, the dyestuff is converted into the urea derivative in known manner by treatment with phosgene. The dried dyestuff of the formula

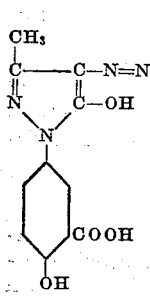

is a brown powder, dissolving with a yellow coloration in water or concentrated sulfuric acid and dyeing cotton in the presence of copper salts in yellow shades very fast to light.

A very similar dyestuff is obtained by replacing the para-nitrobenzoyl-chloride by the meta-compound.

Example 2

The nitrobenzoylated aminoazo-dyestuff of the formula

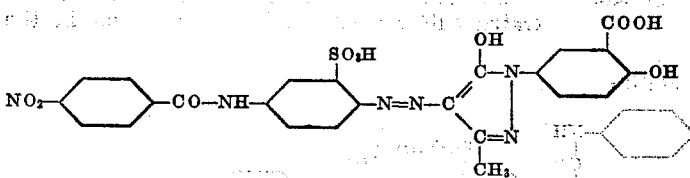

which is prepared exactly like that of Example 1, is dissolved in 2000 parts of warm water and, after addition of 185 parts of caustic soda solution of 30 per cent. strength and 240 parts of an aqueous dextrose solution of 10 per cent. strength, is stirred at 55 to 60° C. for half an hour. 300 parts of sodium chloride are then added and the dyestuff is filtered after cooling. The dried dyestuff of the formula

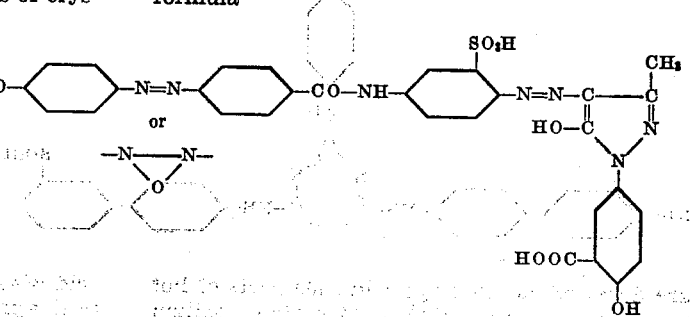

or

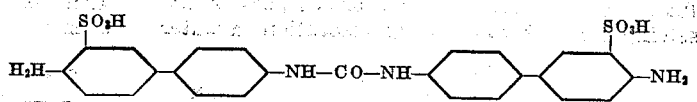

is a brown powder dissolving with a brown-yellow coloration in water or concentrated sulfuric acid and dyeing cotton in the presence of copper salts in fast brown-yellow shades.

Example 3

55.4 parts of 4:4'-diamino-di-(diphenyl)-urea-3:3'-disulfonic acid of the formula

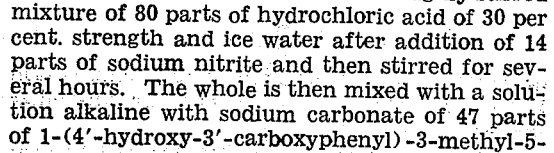

are dissolved in 800 parts of hot water with the addition of sodium carbonate to obtain about a neutral reaction, poured into a thoroughly stirred mixture of 80 parts of hydrochloric acid of 30 per cent. strength and ice water after addition of 14 parts of sodium nitrite and then stirred for several hours. The whole is then mixed with a solution alkaline with sodium carbonate of 47 parts of 1-(4'-hydroxy-3'-carboxyphenyl)-3-methyl-5-pyrazolone. When coupling is complete the dyestuff is filtered and dried. The dyestuff is a brown powder, dissolving with a brown-orange coloration in water or concentrated sulfuric acid and dyeing cotton in the presence of copper salts in fast brown-yellow shades.

The same dyestuff may be obtained by coupling diazotized 4-acetylamino-4'-aminodiphenyl-3'-sulfonic acid with the above pyrazolone,

splitting off the acetyl group and subsequently treating with phosgene.

Example 4

69.2 parts of the condensation product from 2 mols of 4:4'-diaminodiphenyl-3-sulfonic acid, one mol of aniline and 1 mol of cyanuric chloride of the formula

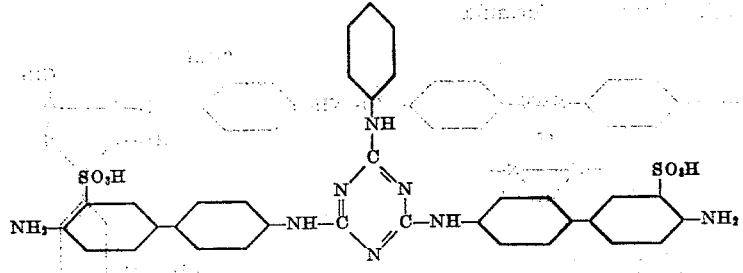

are dissolved as sodium salt in 1000 parts of hot water and, after addition of 14 parts of sodium nitrite, poured into a thoroughly stirred mixture of 80 parts of hydrochloric acid of 30 per cent. strength and ice water. After stirring for some time while cooling the resulting tetrazo compound is coupled with a solution alkaline with sodium carbonate of 47 parts of 1-(4'-hydroxy-3'-carboxyphenyl)-3-methyl-5-pyrazolone. When coupling is complete the precipitated dyestuff is filtered off and dried. It is a brown powder dissolving with a brown-orange coloration in water

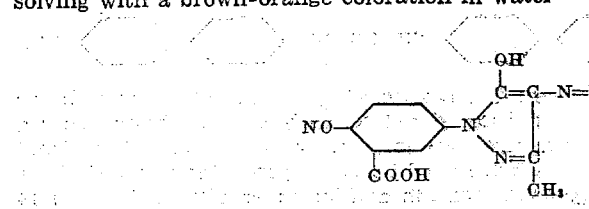

or concentrated sulfuric acid and dyeing cotton in the presence of copper salts in brown-yellow shades fast to light.

A very similar dyestuff is obtained by first preparing the aminoazo-dyestuff and condensing it with cyanuric chloride.

*Example 5*

21.7 parts of 1-amino-4-nitrobenzene-2-sulfamide are diazotized in known manner, then coupled in an alkaline solution with 36 parts of the pyrazolone of the formula

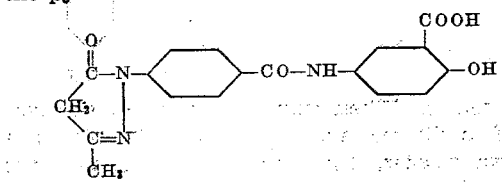

and when coupling is complete, are converted into the aminoazo-dyestuff by heating with 48 parts of crystallized sodium sulfide for several hours. The dyestuff is precipitated by the addition of sodium chloride, then filtered and converted into the urea in known manner by treatment with phosgene. The dry dyestuff of the formula

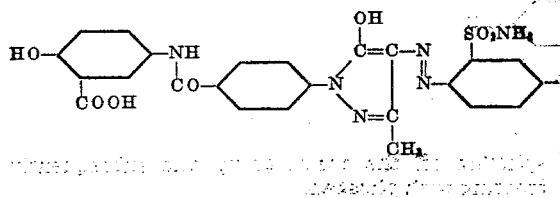

is a red-brown powder dissolving in water with an orange-yellow, and in concentrated sulfuric acid with a yellow coloration and dyeing cotton in the presence of copper salts in orange-yellow shades fast to light.

*Example 6*

34.4 parts of 4:4'-diaminodiphenyl-3:3'-disulfonic acid are tetrazotized in the usual manner and then coupled in a solution alkaline with sodium carbonate with 46.8 parts of 1-(4'-hydroxy-3'-carboxyphenol)-3-methyl-5-pyrazolone. When coupling is complete, the dyestuff of the formula

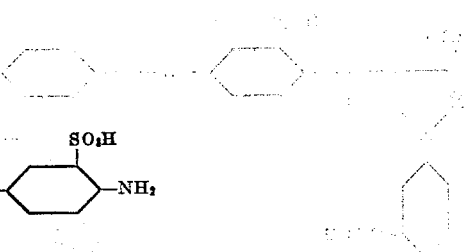

is precipitated by the addition of sodium chloride, filtered off and dried. It is a red-brown powder, dissolving in water with a yellow-brown, in concentrated sulfuric acid with yellow-red coloration and dyeing cotton in the presence of copper salts in red-brown shades very fast to light.

A similar dyestuff is obtained by the use of 4:4'-diamino-5:5'-dichloro-diphenyl-3:3'-disulfonic acid instead of the 4:4'-diaminodiphenyl-3:3'-disulfonic acid.

*Example 7*

34.4 parts of 4:4'-diaminodiphenyl-3:3'-disulfonic acid are tetrazotized in the usual manner and then coupled in a solution alkaline with sodium carbonate with 70.6 parts of the pyrazolone of the formula

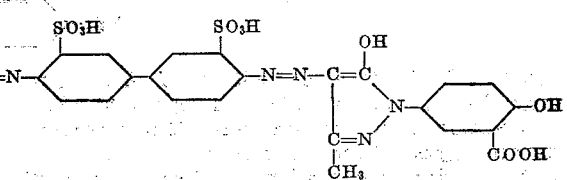

Some sodium chloride is added after the coupling is complete and the dyestuff is filtered off and dried. It is a red-brown powder, dissolving with orange-brown coloration in water and concentrated sulfuric acid and dyeing cotton in the

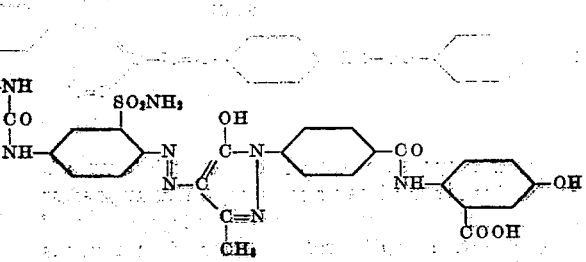

presence of copper salts in fast brown-yellow shades.

Example 8

33.7 parts of 4-amino-4'-hydroxy-3'-carboxy-1:1'-azobenzene-3-sulfonic acid are diazotized in the usual manner and coupled in a solution alkaline with sodium carbonate with 35.3 parts of the pyrazolone of the formula

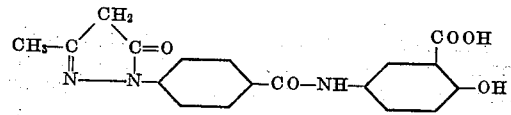

When coupling is complete, the dyestuff is precipitated by the addition of sodium chloride, filtered off and dried. It corresponds to the formula

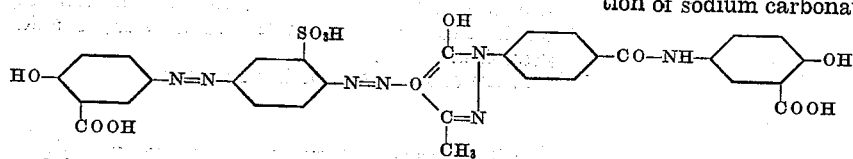

and is dark brown powder dissolving in water with brownish-yellow, and in concentrated sulfuric acid with red coloration and dyeing cotton in the presence of copper salts in fast brown-red shades.

Example 9

5.1 parts of the dyestuff obtained from diazotized 4-amino-4'-acetylamino-diphenyl-3-sulfonic acid and 1-(4'-hydroxy-3'-carboxyphenyl)-3-methyl-5-pyrazolone and saponified with dilute caustic soda solution, and represented by the formula

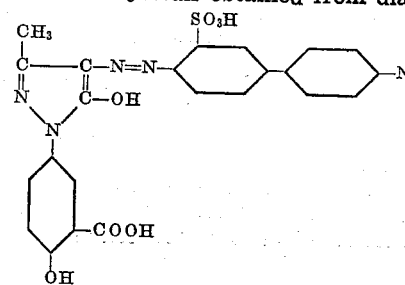

and 5.5 parts of the dyestuff obtained from diazotized 4-nitro-1-aminobenzene-2-sulfonic acid

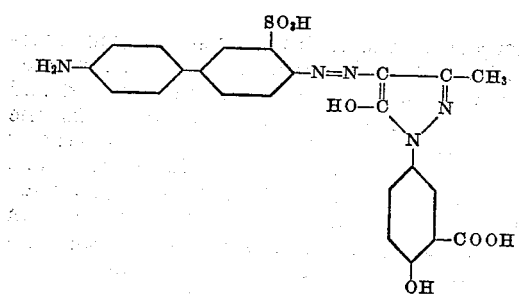

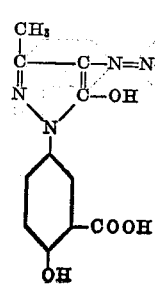

with the same coupling component and subsequently converted in usual manner into the para-aminobenzoylamino-compound, and represented by the formula

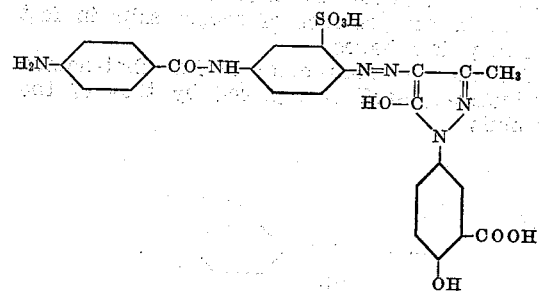

are dissolved in 1000 parts of water with the addition of sodium carbonate and at a temperature of 40 to 50° C. treated with phosgene until it is no longer possible to detect an amino compound; brilliant yellow paper should always indicate a slightly alkaline reaction. The dyestuff, which may contain minor proportions of symmetrical compounds, but chiefly consists of the compound of the formula

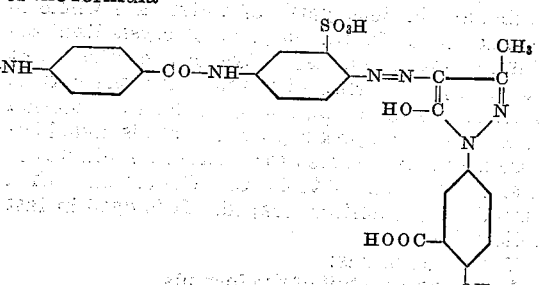

is completely precipitated by sodium chloride, filtered and dried. It is a red-brown powder dissolving in concentrated sulfuric acid with a brown-yellow, in water with yellow-brown coloration and dyeing cotton in the presence of copper salts in fast yellow-brown shades.

Example 10

4.3 parts of the dyestuff obtained from diazotized 4-nitro-1-aminobenzene-2-sulfonic acid and 1-(4'-hydroxy-3'-carboxyphenyl)-3-methyl-5-pyrazolone and reduced to the aminoazo-dyestuff by means of sodium sulfide and 5.5 parts of the para-aminobenzoyl-amino-azo-dyestuff obtained by treating the dyestuff described above with para-nitrobenzoylchloride and reducing are dissolved in 1000 parts of water with addition of sodium carbonate and treated with phosgene at a temperature of 40 to 50° C. until it is no longer possible to detect an amino compound. The dyestuff thus obtained and chiefly corresponding to the formula

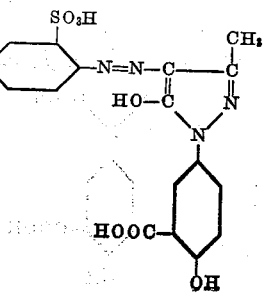

is precipitated by the addition of sodium chloride, filtered off and dried. It is a red-brown powder, dissolving in concentrated sulfuric acid and in water with a yellow-brown coloration and dyeing cotton in the presence of copper salts in fast brown-yellow shades.

A similar dyestuff is obtained if the first-named aminoazo-dyestuff is replaced by that of the formula

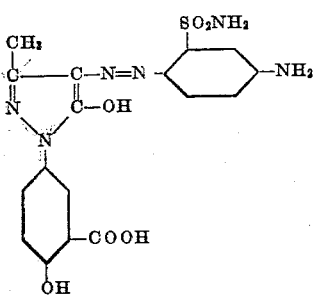

*Example 11*

100 parts of cotton are introduced at a temperature of 40° C. into a dyebath containing 1 part of the dyestuff obtained according to paragraph 1 of Example 1 as well as 2 parts of anhydrous sodium carbonate in 3000 parts of water, the whole is heated to 90° C. and 30 parts of crystallized sodium sulfate are added. Dyeing is carried on at 90 to 100° C. during 45 minutes and the bath is then cooled to 70° C., and a neutralized solution of 1 part of complex copper tartrate is added before dyeing is resumed for another 30 minutes at a temperature of 70 to 80° C. The cotton is then rinsed and, if desired, soaped. It is dyed in fast yellow tints.

What we claim is:

1. An azo-dyestuff of the formula

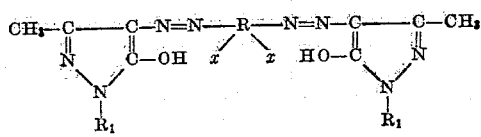

wherein each $x$ is a substituent standing in ortho-position to the corresponding azo-group selected from the group consisting of sulfonic acid and sulfonamide groupings, $x-R-x$ stands for the radical of a diamine of substantive character for cellulosic fibers, and wherein each $R_1$ stands for the radical of an aromatic compound containing up to two benzene nuclei and a salicylic acid grouping.

2. An azo-dyestuff of the formula

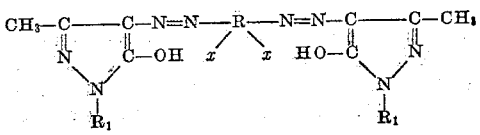

wherein each $x$ is a substituent standing in ortho-position to the corresponding azo-group selected from the group consisting of sulfonic acid and sulfonamide groupings, $x-R-x$ stands for the radical of a diamine of substantive character for cellulosic fibers and containing at least one diphenyl grouping, and wherein each $R_1$ stands for the radical of an aromatic compound containing up to two benzene nuclei and a salicylic acid grouping.

3. An azo dyestuff of the formula

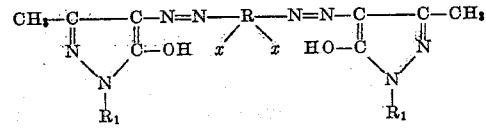

wherein each $x$ is a substituent standing in ortho-position to the corresponding azo-group selected from the group consisting of sulfonic acid and sulfonamide groupings, $x-R-x$ stands for the radical of a diamine of substantive character for cellulose fibers and containing at least one diphenyl grouping and a urea grouping, and wherein each $R_1$ stands for the radical of an aromatic compound containing up to two benzene nuclei and a salicylic acid grouping.

4. An azo-dyestuff of the formula

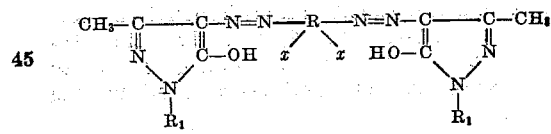

wherein each $x$ is a substituent standing in ortho-position to the corresponding azo-group selected from the group consisting of sulfonic acid and sulfonamide groupings, $x-R-x$ stands for the radical of a diamine of substantive character for cellulosic fibers and containing at least one diphenyl grouping and a 1:3:5-triazine grouping, and wherein each $R_1$ stands for the radical of an aromatic compound containing up to two benzene nuclei and a salicylic acid grouping.

5. The dyestuff of the formula

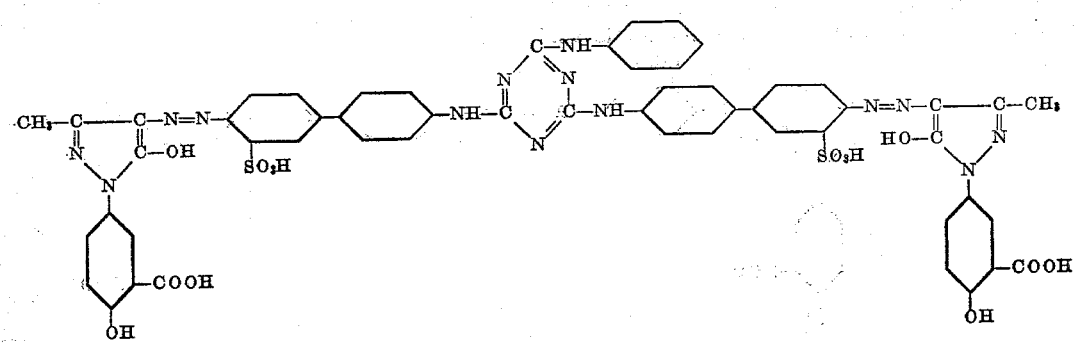

6. The dyestuff of the formula:

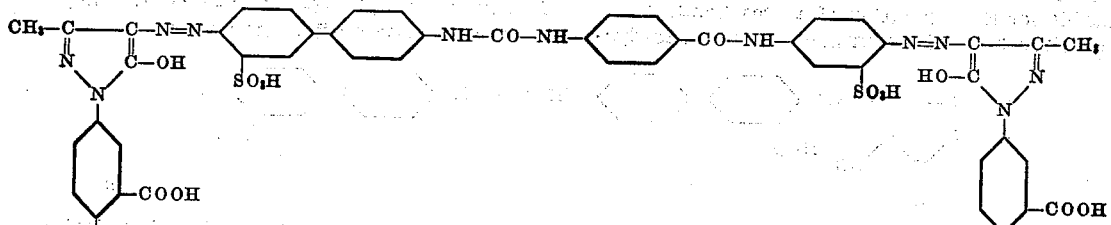

7. The dyestuff of the formula

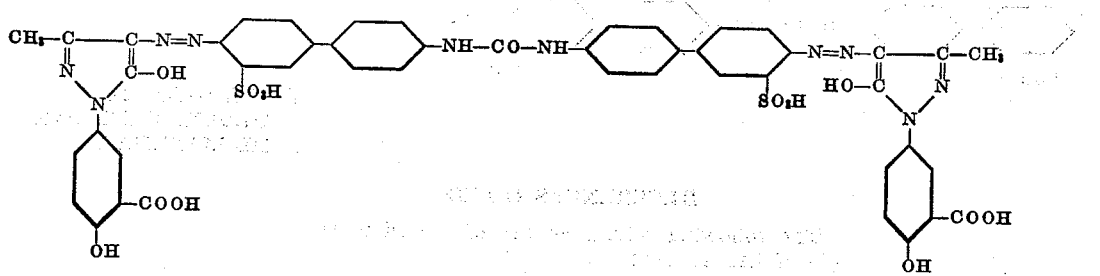

8. Process for the manufacture of an azo-dyestuff, comprising coupling a tetrazo compound of a diamine of substantive character for cellulosic fibers and carrying in ortho-position to at least one diazo group a substituent selected from the group consisting of sulfonic acid and sulfonamide groupings, with pyrazolone containing a salicylic acid grouping.

9. Process for the manufacture of an azo-dyestuff, comprising coupling a tetrazo compound of a diamine of substantive character for cellulosic fibers and carrying in ortho-position to both diazo groups a substituent selected from the group consisting of sulfonic acid and sulfonamide groupings, with pyrazolone containing a salicylic acid grouping.

10. Process for the manufacture of an azo-dyestuff, comprising reacting an amino azo-dyestuff of the formula

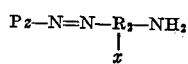

wherein $x$ is a substituent standing in ortho-position to the azo-group selected from the group consisting of sulfonic acid and sulfonamide groupings, $P_z$ stands for the radical of a pyrazolone coupling component containing a salicylic acid grouping, $R_2$ stands for the radical of an aromatic compound containing up to two benzene nuclei in which the groups —N=N— and —NH$_2$ and the linkage of the benzene nuclei stand in para-position to each other, with phosgene under conditions known to be suitable for the formation of a urea bond.

11. Process for the manufacture of an azo-dyestuff, comprising reacting an amino azo-dyestuff of the formula

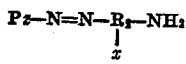

wherein $x$ is a substituent standing in ortho-position to the azo-group selected from the group consisting of sulfonic acid and sulfonamide groupings, $P_z$ stands for the radical of a pyrazolone coupling component containing a salicylic acid grouping, $R_2$ stands for the radical of an aromatic compound containing up to two benzene nuclei in which the groups —N=N— and —NH$_2$ and the linkage of the benzene nuclei stand in para-position to each other, with cyanuric chloride under conditions known to be suitable for attaching the said amino azo-dyestuffs to the triazine ring with elimination of hydrogen chloride.

12. Process for the manufacture of an azo-dyestuff, comprising coupling the tetrazotized diamine of the formula

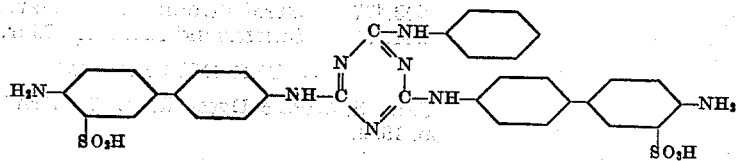

with two molecular proportions of 1-(4'-hydroxy-3'-carboxy-phenyl-) 3-methyl-5-pyrazolone.

13. Process for the manufacture of an azo-dyestuff, comprising reacting one molecular proportion of the amino azo-dyestuff of the formula

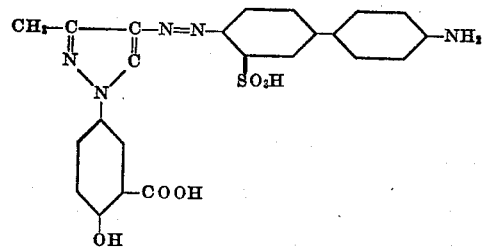

and one molecular proportion of the aminoazo-dyestuff of the formula

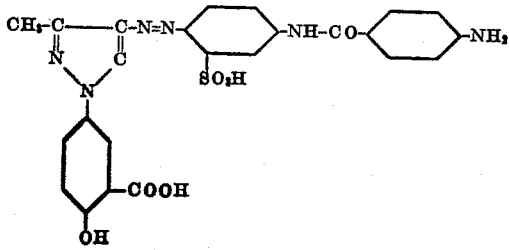

with phosgene under conditions known to be suitable for the formation of a urea bond.

14. Process for the manufacture of an azo-dyestuff, comprising coupling the tetrazotized diamine of the formula

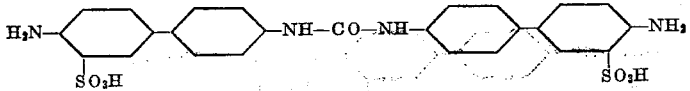

with two molecular proportions of 1-(4'-hydroxy-3'-carboxyphenyl-)-3-methyl-5-pyrazolone.

15. An azo dyestuff of the formula

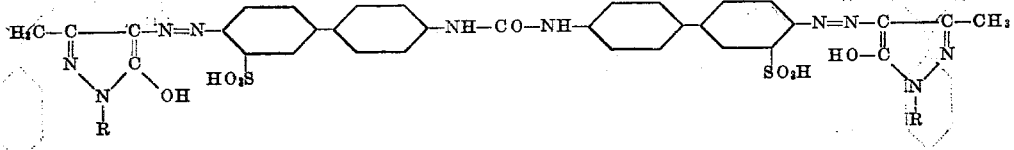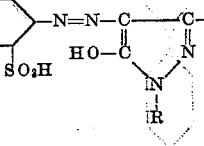

wherein each R stands for a phenyl radical containing a salicylic acid grouping.

FRITZ STRAUB.
WALTHER HANHART.
EMIL MANNHART.

REFERENCES CITED

The following references are of record in the file of this patent:

UNITED STATES PATENTS

| Number | Name | Date |
|---|---|---|
| 1,818,898 | Lange | Aug. 11, 1931 |
| 1,896,450 | Lange | Feb. 7, 1933 |
| 1,951,830 | Krzikalla | Mar. 20, 1934 |
| 2,015,225 | Kracker et al. | Sept. 24, 1935 |
| 2,060,563 | Fischer | Nov. 10, 1936 |
| 2,160,448 | Wehrli | May 30, 1939 |
| 2,182,055 | Schweitzer | Dec. 5, 1939 |
| 2,192,153 | Roos | Feb. 27, 1940 |
| 2,227,504 | Krzikalla et al. | Jan. 7, 1941 |
| 2,228,290 | Suckfull et al. | Jan. 14, 1941 |
| 2,404,198 | Straub et al. | July 16, 1946 |

FOREIGN PATENTS

| Number | Country | Date |
|---|---|---|
| 502,677 | Great Britain | Mar. 21, 1939 |
| 144,198 | Switzerland | Mar. 2, 1931 |

OTHER REFERENCES

Cain, Synthetic Dyestuffs, p. 36, Griffin, London, 1923.

Certificate of Correction

Patent No. 2,494,416                                             January 10, 1950

FRITZ STRAUB ET AL.

It is hereby certified that errors appear in the printed specification of the above numbered patent requiring correction as follows:

Column 4, line 43, for "dyestus" read *dyestuffs*; column 8, line 25, for "carboxyphenol)" read *carboxyphenyl)*; column 9, last formula in Example 8, for

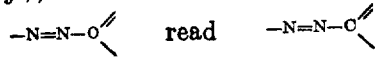

column 13, lines 31 and 39, before "pyrazolone" insert *a*; and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*